United States Patent [19]

Bentley et al.

[11] Patent Number: 5,019,934
[45] Date of Patent: May 28, 1991

[54] CAPACITOR CIRCUIT INTERRUPTION

[75] Inventors: Jeffrey A. Bentley, Riverside, R.I.; Thomas A. Murphy, New Bedford, Mass.

[73] Assignee: Aerovox Incorporated, New Bedford, Mass.

[21] Appl. No.: 471,704

[22] Filed: Jan. 29, 1990

Related U.S. Application Data

[63] Continuation of Ser. No. 287,676, Dec. 20, 1988, abandoned, which is a continuation of Ser. No. 170,655, Mar. 17, 1988, abandoned, which is a continuation of Ser. No. 870,623, Jun. 4, 1986, abandoned.

[51] Int. Cl.$^5$ .......................... H02H 7/16; H01H 1/11
[52] U.S. Cl. ......................................... 361/15; 361/272
[58] Field of Search ..................... 361/15, 16, 17, 37, 361/38, 272, 274, 314, 331

[56] References Cited

U.S. PATENT DOCUMENTS

| | | | |
|---|---|---|---|
| 3,221,225 | 11/1965 | Sternbeck | 361/272 |
| 3,553,542 | 1/1971 | Netherwood | 317/247 |
| 4,059,848 | 11/1977 | Koel et al. | 361/272 |
| 4,106,068 | 8/1978 | Flanagan | 361/15 |
| 4,107,758 | 8/1978 | Shirn et al. | 361/275 |
| 4,186,417 | 1/1980 | Grahame | 361/15 |
| 4,209,815 | 6/1980 | Rollins et al. | 361/15 |
| 4,240,126 | 12/1980 | Sanvito | 361/274 |
| 4,283,750 | 8/1981 | Deschanels et al. | 361/274 |
| 4,286,302 | 8/1981 | Owens et al. | 361/15 |
| 4,298,906 | 10/1981 | Elias | 361/433 |
| 4,308,569 | 12/1981 | Rheindorf | 361/275 |
| 4,339,786 | 7/1982 | Evans et al. | 361/433 |
| 4,342,070 | 7/1982 | Evans | 361/433 |
| 4,486,809 | 12/1984 | Deak et al. | 361/272 |
| 4,586,107 | 4/1986 | Price | 361/272 |
| 4,661,876 | 4/1987 | Strange et al. | 361/15 |
| 4,754,361 | 6/1988 | Venturini | 361/15 |
| 4,757,414 | 7/1988 | Barker et al. | 361/272 |
| 4,812,941 | 3/1989 | Rice et al. | 361/275 |
| 4,897,760 | 1/1990 | Bourbeau | 361/272 |

FOREIGN PATENT DOCUMENTS

| | | |
|---|---|---|
| 0093455 | 9/1983 | European Pat. Off. . |
| 55-8045 | 1/1980 | Japan . |
| 6134916 | 2/1980 | Japan . |
| 55-65844 | 5/1980 | Japan . |

Primary Examiner—J. R. Scott
Assistant Examiner—Jeffrey A. Gaffin
Attorney, Agent, or Firm—Fish & Richardson

[57] ABSTRACT

A capacitor in which the interruption mechanism includes an actuator that moves in response to a predetermined physical condition to cause electrical disconnection of the capacitive element, and in which the actuator has a range of motion through a limited number of stable positions and is mechanically pre-biased to move toward one of the stable positions when not already in one of the stable positions. In another aspect the capacitor housing includes an integral rim around the terminals that is filled with dielectric resin to insulate the terminals from the space surrounding the capacitor housing.

19 Claims, 4 Drawing Sheets

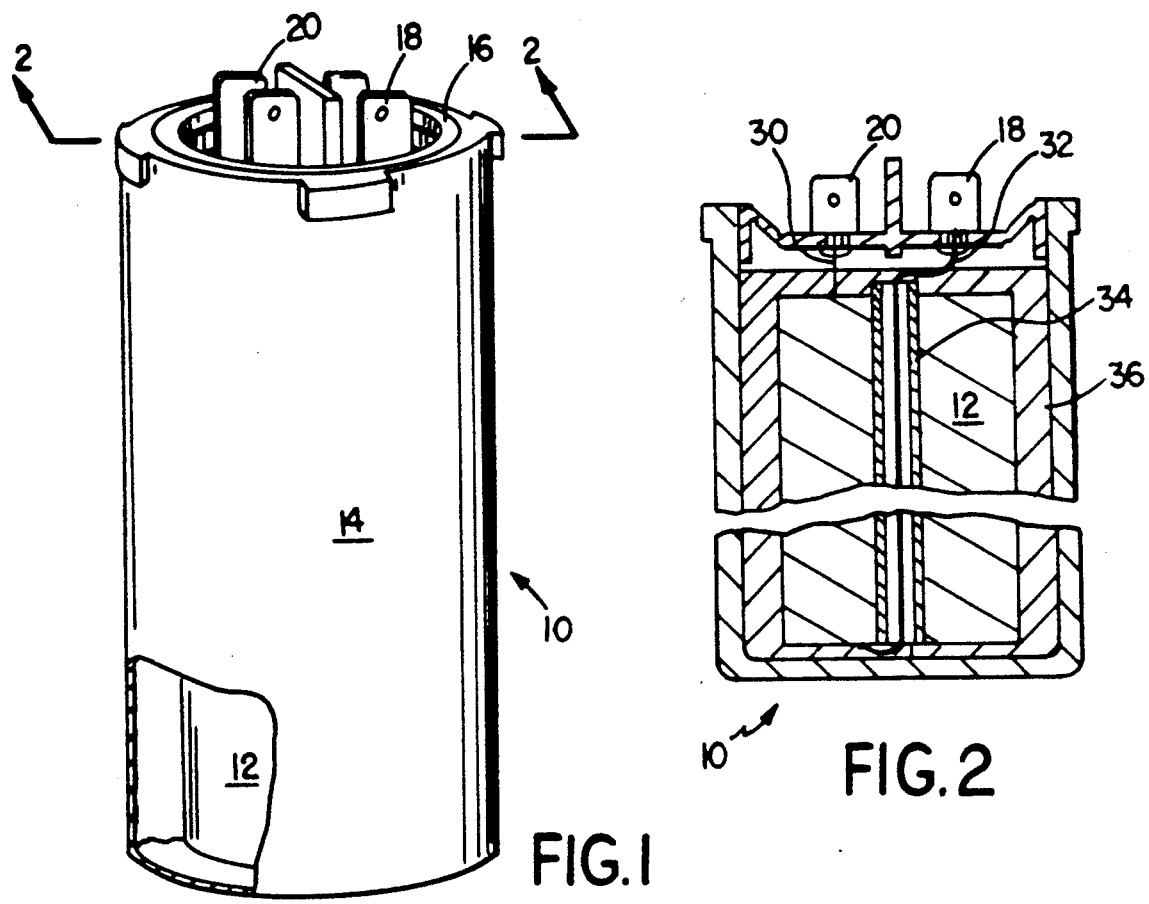
FIG. 1
FIG. 2
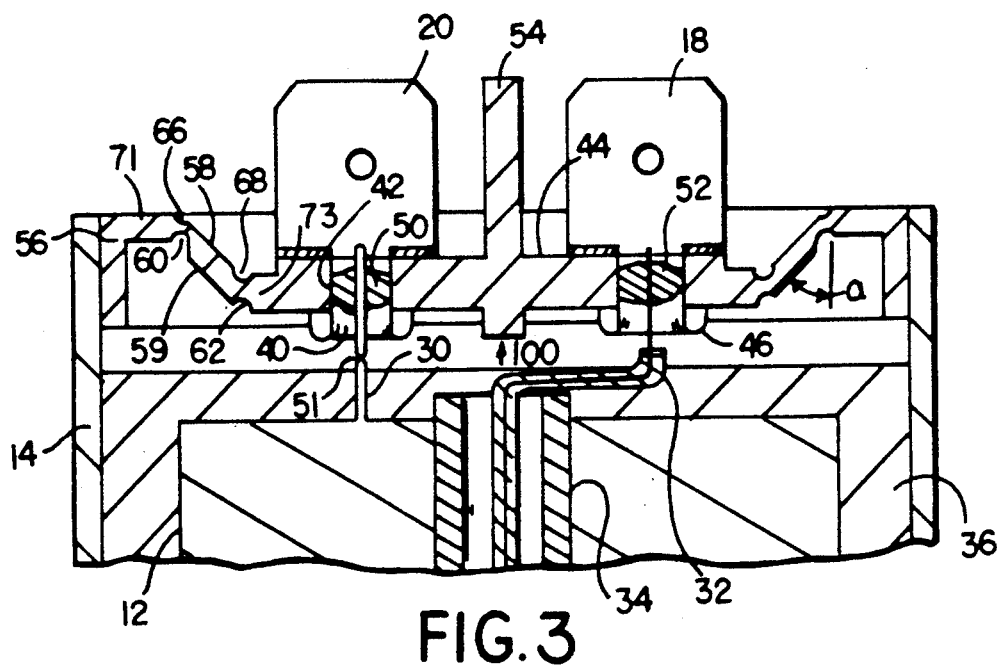
FIG. 3

CAPACITOR CIRCUIT INTERRUPTION

This is a continuation of co-pending application Ser. No. 287,676 filed on Dec. 20, 1988, now abandoned which is a continuation of co-pending application Ser. No. 170,655 filed on Mar. 17, 1988, now abandoned, which is a continuation of co-pending application Ser. No. 870,623 filed on June 4, 1986, now abandoned.

BACKGROUND OF THE INVENTION

This invention relates to circuit interruption in electrical capacitors.

Deterioration of a capacitor typically generates gasses that increase the internal presure within the sealed capacitor case, eventually causing rupture and leakage of the liquid dielectric. Pressure sensitive interrupters are sometimes used within the capacitor case to prevent rupture by breaking the electrical connection to the capacitive element in response to the internal pressure, thus stopping the gas buildup.

Published European patent application 0-093-455-A2 shows an interrupter in which the capacitor has terminals attached to a central disk that is part of the plastic can cover. The central disk is connected to the peripheral rim of the cover by an intermediate deformable "annular wall portion or web of reduced wall thickness" that permits the central disk to move away from the can in response to internal pressure. The capacitive element is held down by a rim around the inside of the plastic can so that as the central disk moves upward it eventually breaks the metal conductors that connect the terminals to the capacitive element.

Sometimes, after a pressure sensitive interrupter has broken the electrical connections, the internal pressure drops and the cover and terminals settle back to their original positions where electrical reconnection or arcing may occur.

SUMMARY OF THE INVENTION

A general feature of the invention is a capacitor in which the interruption mechanism includes an actuator that moves in response to a predetermined physical condition within the capacitor to cause electrical disconnection, and in which the actuator has a range of motion through a limited number of stable positions and is mechanically pre-biased to move toward one of the stable positions when not already in one of the stable positions.

Preferred embodiments of the invention include the following features. The physical condition is internal gas pressure within the capacitor, and the actuator moves in response to the pressure. The actuator comprises a portion of a wall (e.g., the lid) of the housing; the actuator is attached to the housing by a support having at least one rigid section connected to the wall portion and the housing by hinge regions. The wall portion is a disk, the support is a rigid annular rim, and the hinge regions are flexible annular rings. In some embodiments, there is one rigid section, two hinge regions, and two stable positions. In other embodiments, there are two rigid sections interconnected by a hinge region, and three stable positions. In other embodiments, there is an annular rim that is thinner than the wall portion. The capacitor terminals are mounted on the actuator. The electrical connections include conductors between the terminals and the capacitive element and the interruption mechanism further comprises means for retaining each conductor in a fixed position relative to motion of the actuator. The capacitive element includes a core that is ultrasonically welded to the inside of the housing. In other embodiments, a panel is interposed between the capacitive element and the terminals. The housing is plastic and includes a lid on which the actuator is located. The actuator is polypropylene. The capacitor element includes a dielectric impregnant (i.e., a blend of polybutene and polyethylene) having a drop point that is above the normal operating temperature of the capacitor, and is below a temperature that would occur following failure of the capacitor winding. In other embodiments, there is a liquid dielectric impregnant (e.g., polybutene) that is compatible with the plastic of the housing.

Another general feature of the invention is a capacitor in which the terminals are mounted on and project from the housing and the housing includes a rim that surrounds the terminals and is filled with a dielectric material that insulates the terminals.

The capacitive element is quickly and effectively disconnected when pressure builds up. The actuator pops up to aid in the disconnection and stably remains in its popped up position to reduce the chance of reconnection. The entire capacitor is easily made. Mounting the terminals on the actuator assures positive motion of terminals away from the capacitive element. When the terminals are fully insulated, the capacitor can be used safely in tight quarters.

Other advantages and features will become apparent from the following description of the preferred embodiment and from the claims.

DESCRIPTION OF THE PREFERRED EMBODIMENT

We first briefly describe the drawings.

Drawings

FIG. 1 is a perspective view of a capacitor.

FIG. 2 is a diagrammatic sectional side view at 2—2 of the capacitor of FIG. 1.

FIG. 3 is an enlarged sectional side view, broken away, along 2—2 of the capacitor of claim 1.

STRUCTURE

Figure 4:
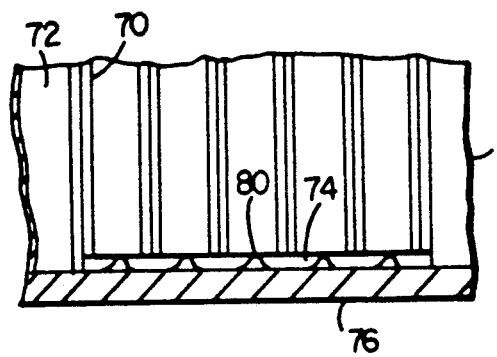
FIG. 4 is a sectional side view of a fragment near the bottom of the capacitor case of FIG. 1.

Referring to FIG. 1, a capacitor 10 includes a capacitor roll 12 inside an injection molded round polypropylene plastic case 14 having an injection molded polypropylene cover 16 (made, e.g., from polypropylene product no. PP-402 available from Monmouth Plastics, or Polyflam RPP 1058 available from A. Schulman) in which two terminals 18, 20 are mounted. Case 14 has a segmented outer rim at the top end for mounting the capacitor.

Referring to FIG. 2, terminal 20 is electrically connected (in a conventional manner) to the top of capacitor roll 12 via an uninsulated tinned copper or tinned copperweld wire 30; terminal 18 is electrically connected (also in a conventional manner) to the bottom of roll 12 via an insulated wire 32 which passes through a hollow polypropylene capacitor core 34 or around the outside of the capacitive element. Capacitor roll 12 is surrounded by and embedded in a dielectric material 36.

Referring to FIG. 3, terminals 18, 20 are of eyelet design and include tubular portions 40 inserted through access holes 42 in a rigid central disk section 44 of cover 16. The ends 46 of tubular portion 40 are bent back against the underside of disk 44 to hold terminals 18, 20 in place.

Wire 30 is pulled taut and attached to terminal 20 by solder 50 and includes a carefully machined nick 51 by which the amount of tension (e.g., 15 lbs) needed to sever the wire can be carefully controlled. Insulated wire 32 is stripped to expose an uninsulated tinned copper conductor (which may also be nicked) that is similarly pulled taut and attached to terminal 18 by solder 52. If wire 32 is not nicked, it is not pulled taut, but is left with slack to allow cover 16 to move and break the nick in wire 30.

In addition to central disk 44, cover 16 includes a rigid L-shaped (in cross-section) peripheral portion 56 ultrasonically welded to the inner wall of case 14. A panel 54 on cover 16 forms an insulative barrier between terminals 18 and 20. A hinged portion 58 connects peripheral portion 56 and central disk 44. Hinged portion 58 is ring-shaped, disposed at an angle of preferably 30°-45° (a) with respect to the vertical, and includes a rigid part 59.

Extending around the outer edge of rigid part 59 (where it joins peripheral portion 56) and around the inner edge of part 59 (where it joins central disk 44) are interior grooves 60, 62 and exterior grooves 66, 68.

Grooves 60, 62, 66, 68 are arranged in pairs with the interior groove and the exterior groove of each pair, e.g., 60, 66, vertically aligned, thus defining two flexible annular rings (hinge regions) 71, 73 which bend when the internal pressure in the can rises.

In one example, central disk 44 is 0.062" thick, part 59 is 0.044" thick, and grooves 60, 62, 66, 68 have typical radii of 0.031". The centers of radius of grooves 60, 62, 66, 68 lie at the intersections of planes that extend from the upper and lower surfaces of part 59, central disk 44, and peripheral portion 56.

Referring to FIG. 4, capacitor 10 includes equally spaced vertical ribs 70 along inside wall 72 of case 14 and an ultrasonic energy directing grid 74 molded into the bottom 76 of case 14.

Figure 5:
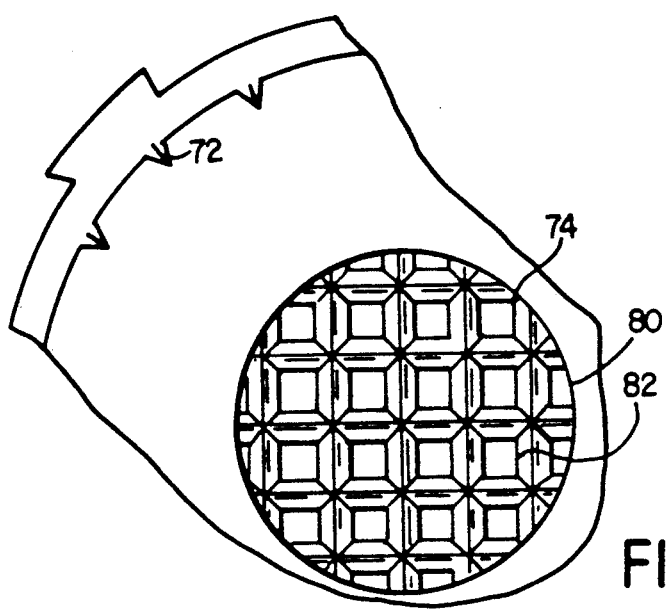
FIG. 5 is a partial top view of the floor of the capacitor case of FIG. 1.

Referring to FIG. 5, ribs 72 extend 0.02 inches into case 14 and are spaced 15° apart about the central axis of case 14. Grid 74 is 0.75 inches in diameter and is concentric with the bottom of case 14. Grid 74 includes upwardly extending peaks 80 and recessed rectangular regions 82.

Figure 6:
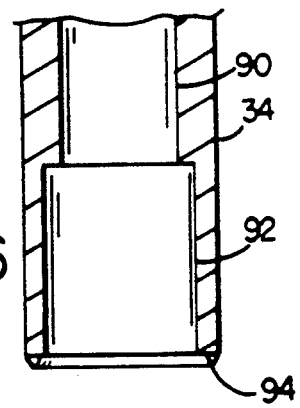
FIGS. 6, 7 are sectional side view and plan view respectively of the capacitive element core of FIG. 3.
Figure 7:
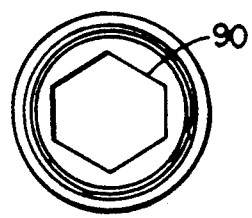

Referring to FIG. 6, 7, the lower section of core 34 includes hexagonal bore 90 and circular bore 92. Energy directing flange 94 extends around the bottom of core 34, and, when placed in case 14, contacts the top of peaks 80 of grid 74 at a limited number of sharply defined contact points at which ultrasonic welding can be accomplished.

Dielectric material 36 may be liquid polybutene as described in copending patent application, U.S. Ser. No. 762,542, filed Aug. 2, 1985, assigned to the same assignee as this application, and incorporated herein by reference. Polybutene has an advantage of not attacking the polypropylene material of case 14.

Alternatively, the capacitor may be formed as a "dry" capacitor by substituting a waxlike blend for dielectric material 36. For example, the blend can be a mixture of polyethylene and polybutene chosen to be non-liquid at normal operating temperatures. As the capacitor begins to fail, the resulting temperature rise causes softening of the mixture, allowing gas to escape to the upper part of the interior of the capacitor case, to trigger operation of the disconnection mechanism. Additional details concerning the blend are set forth in U.S. Pat. No. 4,787,010 issued to Bentley Impregnation and Encapsulating Material, filed on the same day as this application, assigned to the same assignee, and incorporated herein by reference.

Assembly

Terminals 18, 20 are mounted on cover 16 by inserting unbent tubular portions 40 through access holes 42 and bending ends 46 of portions 40 back against the underside of disk 44.

Roll 12 and hollow core 34 are fixed inside case 14 by ultrasonically welding the flange 94 of core 34 to the peaks 80 of grid 74. The sharp lower edge of flange 94 and the sharp upper edges of peaks 80 serve to direct the ultrasonic energy to the contact points between peaks 80 and flange 94, creating a strong weld.

Next, roll 12 and core 34 are encased in material 36.

Cover 16 is then placed into the top of case 14 and wires 30, 32, previously connected to roll 12, are fed up through tubular portions 40. Peripheral portion 56 is ultrasonically welded to case 14. Finally, wires 30, 32 are pulled taut and soldered into place.

Operation

Referring to FIG. 3, when the internal pressure inside case 14 increases, an outward force is exerted on central disk 44 (in the direction indicated by arrow 100.)

Figure 8:
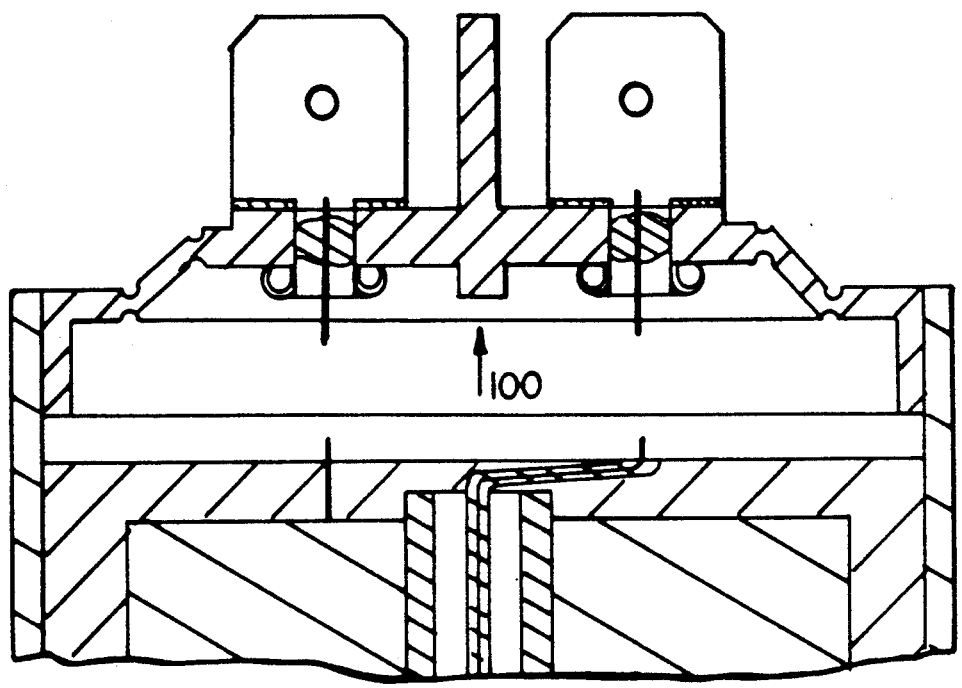
FIG. 8 is a view like FIG. 3 after disconnection.

Eventually the internal pressure becomes large enough to cause central disk 44 to pop outward to occupy a second stable position as shown in FIG. 8.

As disk 44 moves to its new position, it pulls on wire 30, causing it to break at nick 51. Wire 32 may also break if taut and nicked. This halts the flow of electric current through roll 12 and in turn the generation of gasses and the building of increased internal pressure. Rupture of case 14 is thus prevented.

The effect of the design is to provide an actuator that has two stable positions, and is pre-biased to move toward one or the other stable position when not already in one of the stable positions. Thus, as the central disk 44 rises under pressure it reaches a point in its travel where it pops up to its upper position thus aiding rapid and complete disconnect. Once in the upper position the central disk resists downward movement except under a force that exceeds the pre-bias force.

Other Embodiments

Other embodiments are within the following claims.

Figures 9A, 9B, 9C:
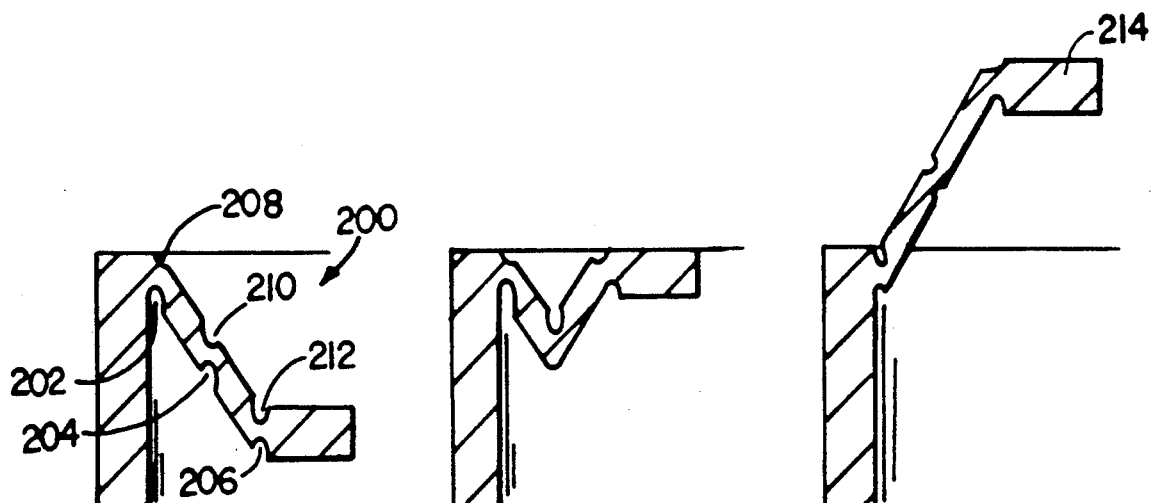
FIGS. 9A, 9B, 9C are a sequence of sectional side views of a fragment of the capacitor lid of FIG. 1, showing three discrete positions of a lid using an alternative hinge arrangement.

For example, referring to FIG. 9A, hinged portion 200 could include three (or more) interior grooves 202, 204, 206 and three (or more) exterior grooves 208, 210, 212. Referring to FIG. 9B, as central disk 214 moves outward portion 200 may bend first at grooves 204, 210, 206, 212 to form a V-shape. Referring to FIG. 9C, as disk 214 continues to move outward additional force on portion 200 causes it to bend at grooves 202, 208. Eventually disk 214 reaches the final position shown in FIG. 9C and portion 200 is once again fully extended.

Figure 10:
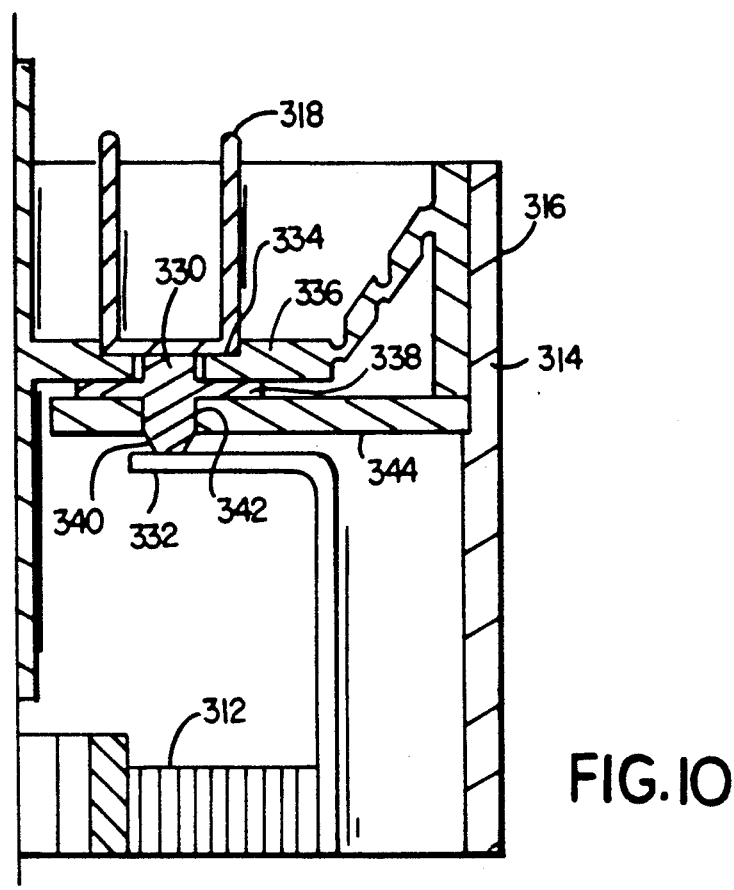
FIG. 10 is a sectional side view of one-half of an alternative embodiment to FIG. 3.

Referring to FIG. 10, in other embodiments, terminal 318 may be electrically connected to capacitor roll 312 via tinned steel terminal rivets 330 spot welded to tinned copper tabs 332. Terminals 318 are mounted on cover 316 by inserting rivets 330 through cover 316 and welding terminals 318 to rivets 330 while applying a clamping force between rivet shoulders 338 and terminals 318. Rivet tips 340 are then inserted through holes 342 in panel 344. Tabs 332 (previously connected to capacitor rolls 312) are spot welded to tips 340. Panel 344 and cover 316 are ultrasonically welded to the inner wall of case 314. As central disk 336 moves outward terminals 318 and rivets 330 also move outward causing an outward force to be exerted on foil tabs 332 and on the welds connecting tabs 332 to rivet tips 340. Tabs 332 are drawn outward until they come in contact with interrupter panel 344. As central disk 336 continues outward, the force exerted on the welds between tips 340 and tabs 332 causes tabs 332 to tear away from tips 340. This breaks the electrical connection between terminals 318 and capacitor roll 312. In the embodiment of FIG. 10, it is not necessary to attach the capacitor roll to the bottom of the case since panel 344 will prevent roll 312 from rising.

The dimensions of the central disk 44 (actuator), part 59, and grooves 60, 62, 68 can be varied to change the flexibility of the hinges and thus control the dynamic characteristics of the interruption mechanism.

When the dielectric impregnant is liquid, other impregnants can be substituted for polybutene, e.g., dioctyl phthalate (DOP), caster oil, or mineral oil, provided that it is not a liquid that will attack the capacitor case.

Other materials can be used for case 14 and core 34 provided that they are chosen from the same organic polymer family to permit ultrasonic welding. More than two terminals could be used. The externally exposed parts of the terminal could be encased in an insulator.

Figure 11:
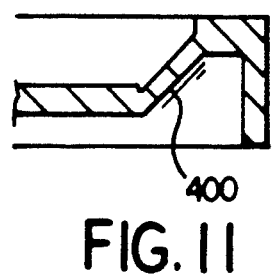
FIG. 11 is a sectional side view of a portion of an alternative capacitor cover.

Referring to FIG. 11, hinged portion 58 may simply be a thinned down region 400 without grooves defining separate hinge regions.

Figure 12:
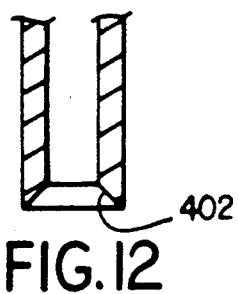
FIG. 12 is a sectional side view of a portion of an alternative capacitive element core.

Referring to FIG. 12, the capacitive element core may be formed by countersinking 402 the end of the core.

Figure 13:
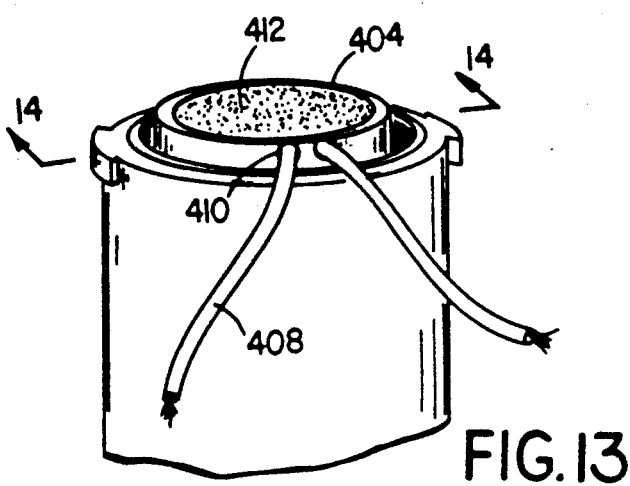
FIGS. 13, 14 are isometric and sectional side views of an alternative capacitor cover.
Figure 14:
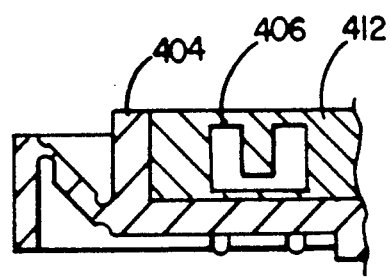

Referring to FIGS. 13, 14, cover 16 may include an annular rim 404 that rises above the level of terminals 406. Wires 408 are attached to terminals 406, and passed through ports 410. Then the space within rim 404 is potted with a dielectric resin material 412, thus eliminating all exposed conductive elements. Such a capacitor is especially useful in close quarters to prevent unintentional contacts, e.g., in HID type lamp ballasts.

Other materials can be used for the cover provided that they have appropriate Physical, thermal, and electrical properties to provide the required mechanical operating features and also to satisfy the requirements of the particular application.

We claim:

1. A capacitor comprising a capacitive element, a housing containing said element, a central portion of a wall of said housing capable of moving outwardly in response to a buildup of internal pressure within said capacitor, said outward movement including an abrupt outward movement in which said central wall portion moves rapidly between two positions in response to an increase in internal pressure, said central wall portion being made of polymer, and being connected to adjoining portions of said housing by a surrounding annular portion also made of polymer, said annular portion abruptly undergoing a change in shape during said abrupt outward movement, means for retarding movement of said capacitive element in the direction of said outward movement during said pressure buildup, at least one terminal in said housing for making an electrical connection to said capacitive element, said terminal being supported on said wall portion, a wire electrically connecting said capacitive element to said terminal, said wire having a preweakened region, said abrupt outward movement providing sufficient tensile force to break the preweakened region in said wire and separate the broken ends of said wire to prevent reconnection.

2. The capacitor of claim 1 wherein said wall portion has a range of motion through a limited number of stable positions and is pre-biased to move toward one of said stable positions when not already in one of said stable positions.

3. The capacitor of claim 1 wherein said wall portion is attached to said housing by a support.

4. The capacitor of claim 3 wherein said support comprises at least one rigid section connected to said wall portion and said housing by a hinge region.

5. The capacitor of claim 4 wherein said wall portion comprises a disk, said support comprises a rigid annular rim, and said hinge region comprises one or more flexible annular rings.

6. The capacitor of claim 4 wherein there are two said rigid sections and two said hinge regions, one said hinge region connecting two of said rigid sections, and the other said hinge regions connecting the inner of said rigid sections to said inner portion.

7. The capacitor of claim 1 wherein said capacitive element includes a polymer core that is ultrasonically welded to the inside of said housing.

8. The capacitor of claim 1 wherein said means for retarding movement comprises a panel interposed between said terminals and said capacitive element.

9. The capacitor of claim 2 wherein said housing is a polymer and said wall portion is on a lid of said housing.

10. The capacitor of claim 1 or 9 wherein said polymer is polypropylene.

11. The capacitor of claim 1 wherein said capacitor is impregnated with a dielectric impregnant having a softening point above the normal operating temperature of said capacitor, and below a temperature that would occur following failure of the capacitor winding.

12. The capacitor of claim 11 wherein said impregnant comprises a blend of at least two components one of which is polybutene.

13. The capacitor of claim 12 wherein a second of said component comprises polyethylene.

14. The capacitor of claim 1 wherein said capacitor comprises a liquid dielectric impregnant that is compatible with said polymer.

15. The capacitor of claim 14 wherein said impregnant is polybutene.

16. The capacitor of claim 1 wherein said preweakened region comprises a nick in said wire.

17. A capacitor comprising
a capacitive element,
a housing containing said element,
a first portion of a wall of said housing capable of moving outwardly in response to a buildup of internal pressure within said capacitor,
at least one terminal on said housing for making said electrical connection to said capacitive element, said terminal being supported on said first wall portion,
said capacitive element being held down and prevented from moving in said outward direction during said pressure buildup by a direct connection of said capacitive element to a second wall portion of said housing located on the other side of said housing from said first wall portion.

18. The capacitor of claim 17 wherein said housing and first and second wall portions and said core are made of one or more polymers.

19. The capacitor of claim 18 wherein the connection of said core to said second wall portion is by ultrasonic welding.

* * * * *

UNITED STATES PATENT AND TRADEMARK OFFICE
CERTIFICATE OF CORRECTION

PATENT NO. : 5,019,934

DATED : May 28, 1991

INVENTOR(S) : Jeffrey A. Bentley and Thomas A. Murphy

It is certified that error appears in the above-identified patent and that said Letters Patent is hereby corrected as shown below:

Column 1. line 15, "presure" should be --pressure--.

Column 2, line 49, "capactive" should be --capacitive--.

Column 5, line 63, "Physical" should be --physical--.

Column 6, line 55, claim 9, "claim 2" should be --claim 1--.

Signed and Sealed this

Twenty-ninth Day of December, 1992

Attest:

DOUGLAS B. COMER

Attesting Officer

Acting Commissioner of Patents and Trademarks